United States Patent [19]
Raleigh

[11] 3,789,954
[45] Feb. 5, 1974

[54] AIR MOTOR NOISE SUPPRESSOR
[75] Inventor: Walter J. Raleigh, St. Paul, Minn.
[73] Assignee: Graco Inc., Minneapolis, Minn.
[22] Filed: June 19, 1973
[21] Appl. No.: 371,433

[52] U.S. Cl............... 181/33 K, 181/36 R, 181/50, 181/53, 417/312
[51] Int. Cl......................... F01m 3/06, F04b 21/00
[58] Field of Search.. 181/33 K, 36 R, 36 A, 42, 50, 181/53, 57; 417/312, 313

[56] References Cited
UNITED STATES PATENTS
1,610,774  12/1926  Hanson................................. 417/32
2,123,358  7/1938  Grutzner..................... 181/33 K UX
3,276,539  10/1966  Dear et al. ................. 181/33 K UX
3,296,997  1/1967  Hoiby et al. .................. 181/36 R X
3,723,027  3/1973  Montelius..................... 181/33 K X Primary Examiner—Stephen J. Tomsky
Assistant Examiner—John F. Gonzales
Attorney, Agent, or Firm—Paul L. Sjoquist

[57] ABSTRACT

Self-contained apparatus is described for reducing the acoustic and mechanical noise associated with an air-operated motor, wherein noise signals are contained within a sealed enclosure surrounding the air motor and channeled over a complex path including noise filters to the atmosphere.

10 Claims, 6 Drawing Figures

AIR MOTOR NOISE SUPPRESSOR

This invention relates to noise-suppression apparatus, particularly for use with air-operated motors commonly found in industrial applications for driving pumps. These motors are characteristically operated on energy derived from high pressure air and on each pump cycle may emit one or several blasts of air into the surrounding atmosphere.

Air motors are typically connected mechanically to reciprocating pumps for the purpose of moving a pump piston over a linear range. The pump, in turn, generally causes the movement of fluids or viscous substances through a supply line. Such pumps are used for moving paints, greases, mastics, and any number of other light and heavy fluids. The air motor is particularly adapted for this type of operation because it operates against fluid line pressure, remaining quiescent during periods when no fluid is drawn from the supply line but becoming active whenever fluid flow causes a line pressure drop. The air motor is connected to a source of high pressure air, typically around 100 p.s.i., which controls a movable piston. The piston moves over a prescribed stroke and reverses itself at the end of this stroke. At the end of the piston stroke, the compressed air is relieved by valving from one side of the piston and emitted into the atmosphere, and is applied to the other side of the piston to drive the piston back to its original position. When operating, the air motor characteristically emits a blast of air at the end of its operating stroke, which blast causes a loud acoustic disturbance to the atmosphere. In addition, there is a significant audible noise caused by the mechanical driving force of the moving piston and other parts associated with the air motor and pump. The air and mechanical noise levels are annoying to any person working in the area of the system, and in some cases may exceed the permissible noise level set by recently enacted health and safety regulations.

It is possible to reduce the air noise level by ducting the air pressure blasts via exhaust pipes to a region away from the work area, but this is frequently expensive or impractical. It is also possible to minimize the mechanical noise of such a system by placing it in a large acoustically insulated container, but this is also frequently impractical or excessively expensive. Furthermore, such solutions inhibit access for the normal maintenance required of air motor and pump assemblies.

There are conventional muffler devices which can be adapted for use with an air motor assembly to reduce noise. However, these units suffer the disadvantage that they introduce a large back pressure into the system and degrade the operating efficiency of the air motor. It is a desired objective of this invention to provide an acoustic noise suppression apparatus without significantly affecting the performance of the air motor, and therefore without introducing back pressure which can degrade air motor performance.

The present invention overcomes previous disadvantages by providing a mechanical and air-blast noise reducer which greatly reduces air motor noise without affecting its operating efficiency or ease of maintenance. The invention is effective chiefly over the frequency range of greatest noise, reducing such noise frequencies to tolerable and acceptable levels. A preferred embodiment of the invention is described in the following specification and claims, and in the drawings, in which:

Briefly, the invention comprises an enclosure having a removable top portion and a fixed base portion, which enclosure fits over an air motor. The invention has appropriate sound insulating materials applied to its inside surface, and further has an acoustic ducting network near its top for enabling the passage of air to the outside while filtering a significant amount of acoustic noise associated with such air passage. The fixed base portion of the invention also serves to inhibit mechanical noise generated by the reciprocating air motor shaft.

Figure 1A:
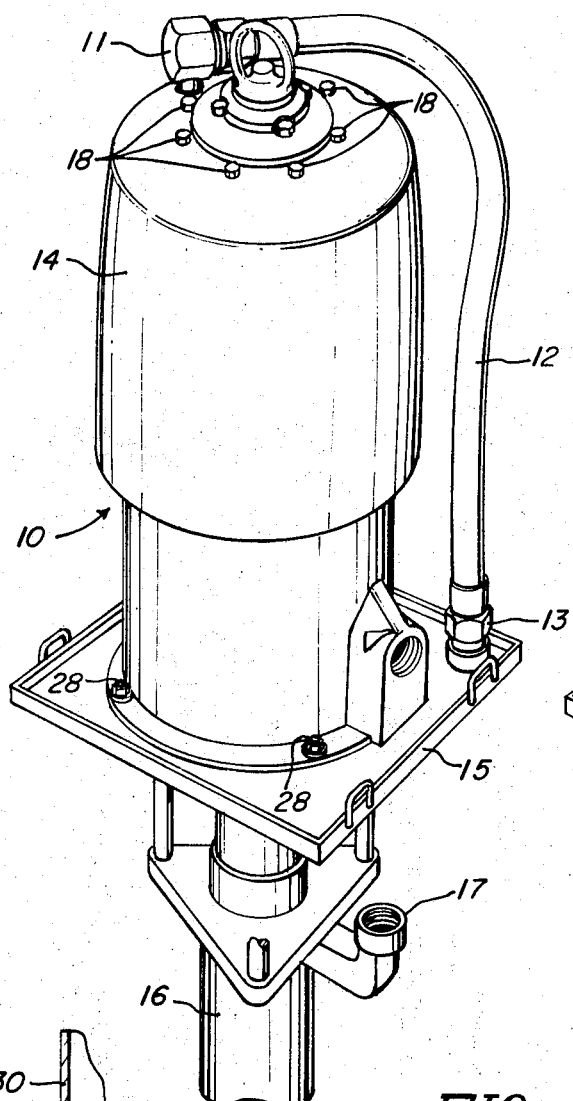
FIG. 1A and 1B are an external and internal partial view of a typical air motor assembly.

Referring first to FIG. 1A, in which air motor 10 is shown in perspective view. Air motor 10 is operated from a high pressure air source which is typically connected at coupling 11 to the interior of the air motor. For purposes of the present invention, the air inlet at coupling 11 is extended via hose 12 to a second coupling 13 which is mounted to base 15 and passes through base 15 for external connection. Base 15 forms the bottom portion of this invention, serving both as a support for the other components of the invention and also as a noise reducer as will hereinafter be described. Air motor 10 is typically connected to a pump 16 which is immersed in a pumping material. In operation, the material to be pumped is pumped via outlet 17, to which appropriate hoses or pipes are attached. A bell 14 serves as an external cover for air motor 10, and also acts as a first level noise suppressor. The bell 14 is securely attached to the air motor frame by means of a plurality of bolts 18. The bottom interior surface of bell 14 snugly fits over the external circumference of ring 21, shown on FIG. 1B. Ring 21 has a plurality of holes 22 through which air is conveyed downwardly. A typical air motor may have 16 holes 22 equally spaced around the circumference of ring 21, each hole having a diameter of approximately 0.15 inches. The air exhausted from the air motor is forced through these holes after being deflected by the interior surface of bell 14. Although it is generally preferable to avoid any noise suppression device which creates a back pressure, it is necessary for some back pressure to be developed inside of bell 14. The high pressure air emitted from region 25 of air motor 10 causes an extreme chilling effect as it is blasted outward, due to the sudden pressure drop. This pressure drop, if not subdued somewhat by the back pressure within bell 14 can freeze the moisture in the surrounding air and create ice particles which could be blown into the atmosphere to cause harmful effects. Also, the temperature of the air motor components in region 25 will drop well below 0° F, and this could damage the air motor parts. Therefore, bell 14 not only acts as a first level noise suppressor, but it also tempers the chilling effect of the high pressure exhaust blasts.

Figure 1B:
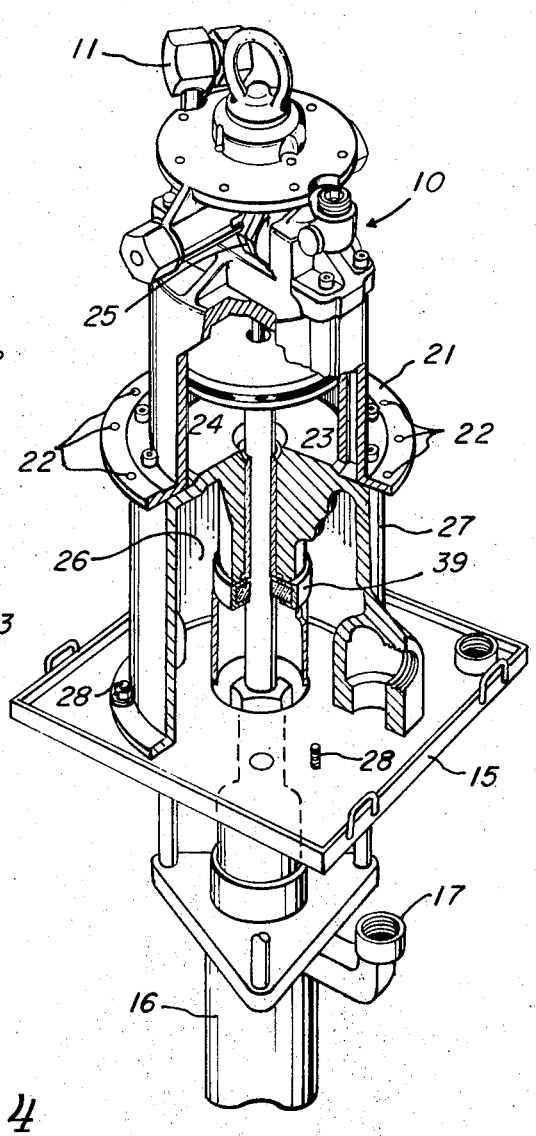

FIG. 1B illustrates some of the operational components of air motor 10. A piston 23 is reciprocated upward and downward through the application of high pressure air through inlet coupling 11. Internal valving selectively channels the air supply to either the top surface of piston 23 or its bottom surface to cause this reciprocating motion. At the end of each stroke, the compressed air in the cylinder is valved out of the cylinder by means of ports (not shown) generally located in region 25 near the top of the air motor. This air exhaust region 25 emits an extremely loud air noise in a plurality of radial directions.

Piston 23 is mechanically coupled by means of drive shaft 24 to a pump mechanism within pump 16. As shaft 24 reciprocates, the linkage connected to piston 23 comes into contact with valve mechanisms during each stroke. This causes a loud mechanical noise to be emitted generally downward at the base of the air motor. This noise appears loudest immediately above motor 10 and below it in the chamber 26 created by the air motor housing 27.

Air motor housing 27 and base 15 are resiliently attached together by means of bolts 28 and suitable rubber bushings. These bolts also serve to bolt the entire assembly to an external support arrangement (not shown). Typically, this external support arrangement includes a mechanism for raising and lowering the entire assembly into a container having fluid pump material, but such raising and lowering mechanism does not form a part of the invention.

Figure 2:
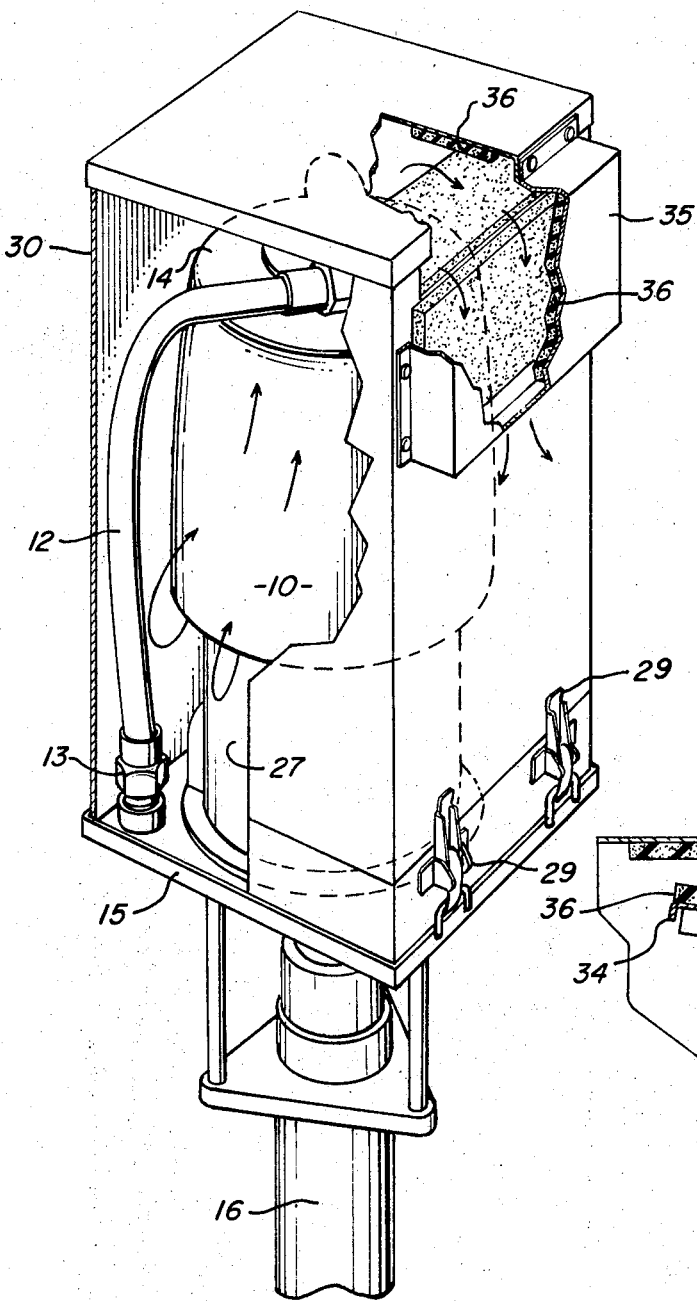

FIG. 2 illustrates the invention attached to an air motor in a manner typically found in actual use. An enclosure 30 is attached to base 15 by means of latches 29, to form a tight acoustical shield around all sides of air motor 10. The interior surface of enclosure 30 is coated with a sound-deadening and vibration-dampening material, typically a petroleum-based mastic. This material functions to decrease the resonance of the walls of enclosure 30 and to some extent enables enclosure 30 to be made from thinner stock than would otherwise be necessary. Attached to the outside of enclosure 30 near its top surface is a deflector plate or muffler 35, which communicates with the interior of enclosure 30 by means of an elongated slot cut through the width of enclosure 30. The interior surface of muffler 35 is layered with a porous, resilient urethane foam material 36. A similar material is used against the surfaces of other portions of the invention as will hereinafter be described.

The thickness of the layer of foam material 36 is dependent upon the frequencies of the noise spectrum which is desired to be suppressed. For the present invention a foam layer of approximately ½ inch in thickness has proved satisfactory, where the foam material is open-celled and has a weight density of about 2 pounds per cubic foot.

The arrows in FIG. 2 indicate generally the path of air flow in relationship to the invention. Air exhaust from the air motor is emitted through the plurality of holes 22 as described previously; this air is directed downwardly within enclosure 30. The interior surface of base 15 deflects the air upwardly, and ultimately through muffler 35. Muffler 35, in turn, deflects the exhaust air downardly into the atmosphere. Thus, it can be seen that the air flow path is significantly changed three times: First, deflected downwardly, and then upwardly within enclosure 30, and finally outward and downwardly through muffler 35. This complex air flow path aids in the suppression of acoustic noise generated by the air exhaust.

Figure 3:
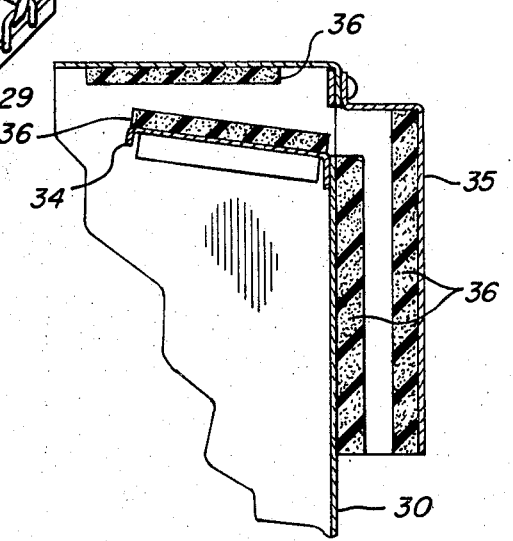
FIG. 3 illustrates in side view cross-section the air exhaust portion of the invention.

FIG. 3 illustrates a portion of enclosure 30, together with muffler 35. A baffle plate 34 is attached within enclosure 30 to deflect exhaust air outwardly through the slot in enclosure 30, to the interior of muffler 35. Baffle 34 extends the entire interior width of enclosure 30, and is coated with a layer of foam material 36. The length of baffle 34 is primarily dictated by space requirements internal to enclosure 30. However, in particular applications, baffle 34 may be increased in length and muffler 35 may be correspondingly decreased in length. It is the combined effects of the total passage created by baffle 34 and muffler 35 acting together which create the desired noise suppression effect. In the preferred embodiment of the invention, foam material 36 may be placed in the relative positions illustrated in FIG. 3. Baffle plate 34 has a slight upward incline as illustrated in FIG. 3. This incline is primarily introduced because of interior space restrictions, it being necessary to fit baffle 34 within enclosure 30 without making contact with air motor bell 14. An alternate approach would be to increase the length dimension of enclosure 30, and thereby increase the interior space to allow baffle 34 to be constructed horizontally. It is important that the cross-sectional area of the exhaust port formed by the baffle plate 34 and muffler 35 be considerably greater than the total area of all of the holes 22. Exhaust port cross-sectional areas of the order of 10–100 times the total cross-sectional areas of all of the holes 22 is adequate for this purpose. This significantly reduces the back pressure effect which would otherwise be caused by enclosure 30 and muffler 35. Reduction of back pressure enables the pump to operate more efficiently and also minimizes the problem of sealing enclosure 30 around the air motor.

Figure 4:
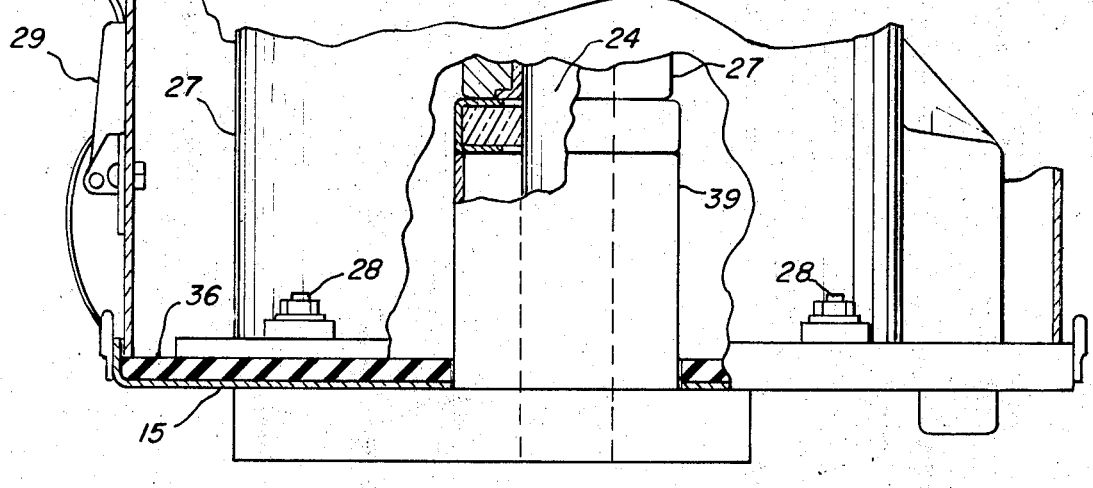
FIG. 4 is a partial cross-section of the bottom portion of the invention.

FIG. 4 illustrates a partial cross-section of the lower portion of enclosure 30 and base 15. A collar 39 which forms an upward projection of base 15 is sealably attached around shaft 24. Collar 39 abuts against the lower portion of the pump housing 27. The purpose of collar 39 is to create a complete seal between the interior chamber 26 of housing 27 and base plate 15. This prevents mechanical noise from being emitted through the bottom portion of the air motor and thereby improves the noise suppression characteristics of the invention.

Figure 5:
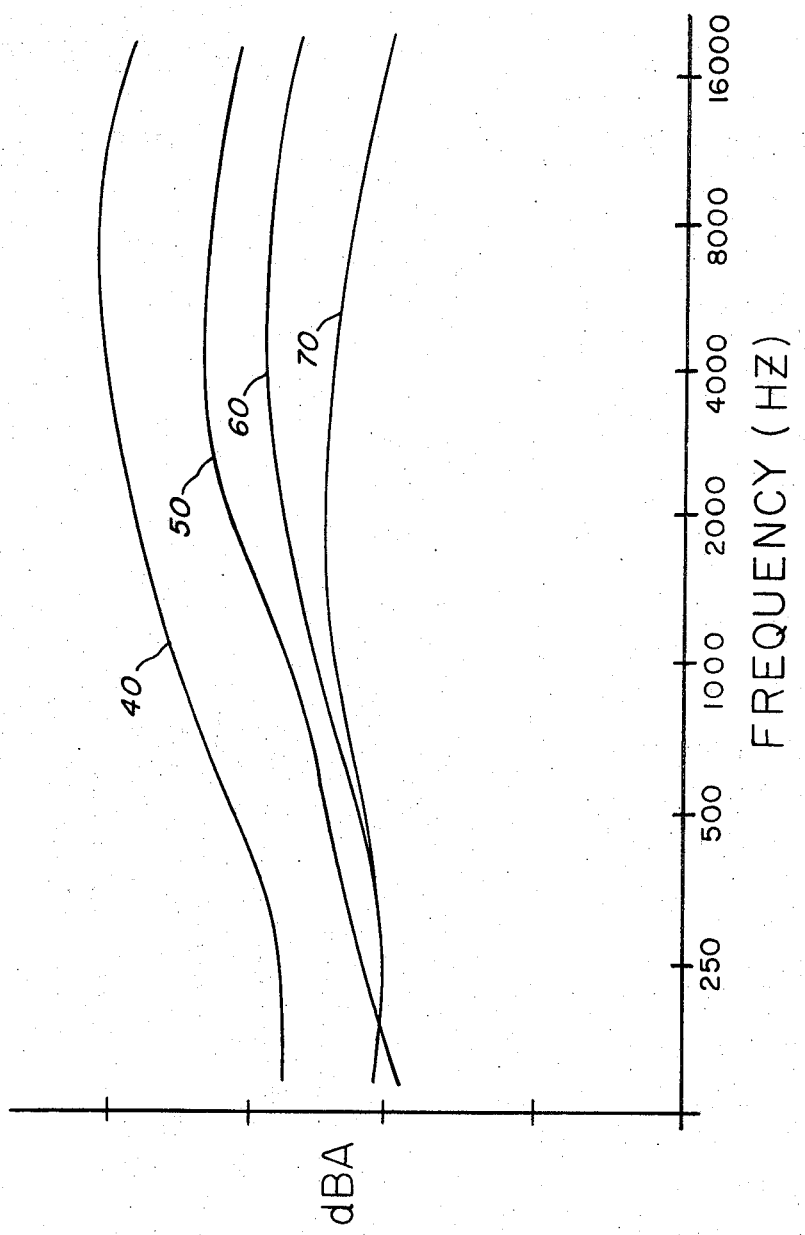
FIG. 5 is a graph of relative noise levels using various portions of the invention.

FIG. 5 illustrates several curves plotted on a graph showing the relative noise spectrum of an air motor in combination with the several elements of the invention. Noise measurement tests run with the air motor alone and without bell cover 14 have shown the average noise level, measured with a microphone approximately 3 feet from the air motor, of 106 decibels (dBA) above a standard reference noise pressure level. This is illustrated in FIG. 5 as curve 40. The greatest noise occurs over a frequency range from approximately 1,000 Hertz (HZ) to 16,000 HZ.

Curve 50 of FIG. 5 illustrates the relative noise reduction when cover bell 14 is added to the air motor. Under these circumstances tests have indicated a relative average noise level in the range of 95 decibels (dBA). Curve 60 illustrates the improvement when enclosure 30 is added as a further noise suppressor. This yields an average noise measurement approximately 10 dBA less than that shown by curve 50. Curve 70 shows the noise spectrum with all portions of the invention included and attached to the air motor as hereinbefore described. In this case, the average noise is further reduced by about 10 dBA. Thus it can be seen that the use of the invention (curve 70) in conjunction with the air motor (curve 40) greatly reduces the noise spectrum. Operating results with the invention are well within the noise limits prescribed by current regulations and safety and health standards.

While a preferred embodiment of my invention has been described herein, numerous variations may be made within the scope of my invention. For example, the shape of enclosure 30 may be varied to include cylindrical covers. The relative sizes of baffle 34 and muffler 35 may be varied in particular applications for optimum results, so long as the overall objective of providing a completely self-contained noise suppression apparatus as herein described is followed.

I claim:

1. Apparatus for suppressing air motor noise caused by mechanical contact of said air motor moving parts and by air exhaust blasts emitted from said motor exhaust ports, comprising:

a first enclosure surrounding said motor exhaust ports and having a plurality of exhaust holes for releasing said air exhaust blasts;

a base portion sealably attached to and covering the bottom of said air motor;

a second enclosure surrounding said first enclosure and detachably connected to said base portion, said second enclosure having an outlet hole; and an open-ended muffler duct attached to said second enclosure in alignment with said outlet hole.

2. Apparatus as claimed in claim 1, further comprising a layer of resilient foam material covering the surface area within said muffler duct.

3. Apparatus as claimed in claim 2, wherein said open-ended muffler duct further comprises a baffle plate internal said second enclosure and a deflector plate external of said second enclosure.

4. Apparatus as claimed in claim 3 wherein said base portion further comprises a sealing collar surrounding said air motor drive shaft.

5. Apparatus as claimed in claim 4, further comprising a layer of sound-deadening mastic material over the inner surface of said second enclosure.

6. Apparatus as claimed in claim 5 wherein the cross-sectional area of said muffler duct open end is 10–100 times the cross-sectional area of said first enclosure plurality of exhaust holes.

7. In an air driven motor assembly having exhaust air emitted during each stroke of the motor, the improvement comprising:

a. an enclosure surrounding the entire air motor assembly and having sealable connections for the air inlet supply and motor drive shaft;

b. an air outlet in said enclosure; and c. a baffle and deflector plate attached to said enclosure and aligned with said air outlet to form an elongated air duct in communication with said enclosure interior and exterior.

8. Apparatus as claimed in claim 7 further comprising a layer of resilient foam material over a substantial portion of said elongated air duct interior surface.

9. Apparatus as claimed in claim 8 further comprising a surface of sound-deadening mastic material over substantially the entire inner surface of said enclosure.

10. Apparatus as claimed in claim 9 wherein said elongated air duct is partially external to said enclosure and has a downwardly extending external open end.

* * * * *